United States Patent [19]
Husted

[11] Patent Number: 4,977,793
[45] Date of Patent: Dec. 18, 1990

[54] PLASTIC STABILIZED COMPOSITE CAMSHAFT

[76] Inventor: Royce H. Husted, 711 Lakeside Dr., Wheaton, Ill. 60187

[21] Appl. No.: 331,492

[22] Filed: Mar. 31, 1989

Related U.S. Application Data

[63] Continuation-in-part of Ser. No. 208,382, Jun. 17, 1988, abandoned, which is a continuation-in-part of Ser. No. 103,843, Oct. 1, 1987, abandoned.

[51] Int. Cl.$^5$ .............................................. F16H 53/00
[52] U.S. Cl. ................................... 74/567; 123/90.6; 403/267; 403/359
[58] Field of Search ............................ 74/567, 568 R; 123/90.6, 90.17; 264/262, 230; 403/267, 268, 269, 359, 381; 164/98, 112

[56] References Cited

U.S. PATENT DOCUMENTS

| | | | |
|---|---|---|---|
| 1,493,199 | 5/1924 | Havens | 264/262 X |
| 2,320,541 | 6/1943 | Wilson | 264/262 X |
| 3,212,353 | 10/1965 | Chapin et al. | 74/567 |

FOREIGN PATENT DOCUMENTS

| | | | |
|---|---|---|---|
| 119112 | 9/1984 | European Pat. Off. | 74/567 |
| 53-17816 | 2/1978 | Japan | 74/567 |
| 55-46949 | 4/1980 | Japan | 264/262 |
| 56-39356 | 4/1981 | Japan | 74/567 |
| 61-59062 | 3/1986 | Japan | 74/567 |
| 243518 | 12/1925 | United Kingdom | 264/262 |
| 1051558 | 12/1966 | United Kingdom | 403/268 |
| 2133104 | 7/1984 | United Kingdom | 74/567 |

Primary Examiner—Rodney M. Lindsey
Attorney, Agent, or Firm—Nicholas A. Camasto

[57] ABSTRACT

A plastic stabilized composite camshaft and method. In one version, a hollow polished tube is positioned within appropriately aligned and fixtured annular cam elements having interior protrusions that increase in size toward the tube axis and a flowable, hardenable material is injected through the tube to fill the voids between the tube and the cam elements for securing the cam elements to the tube. The protrusions enhance the grip of the plastic with shrinkage. The surfaces of the tube and of the cam elements are preground to finish dimensions. In another version, the annular cam elements are originally circular and formed into their final configuration in the mold by appropriately configured side acting shuttles. In a preferred embodiment for automotive applications, the shaft and cam elements have nesting configurations that form a continuous space therebetween such that the hardened material compressionally resists torsional forces between the shaft and cam elements. A method of injection molding without substantially stressing the freely supported shaft is also disclosed.

11 Claims, 9 Drawing Sheets

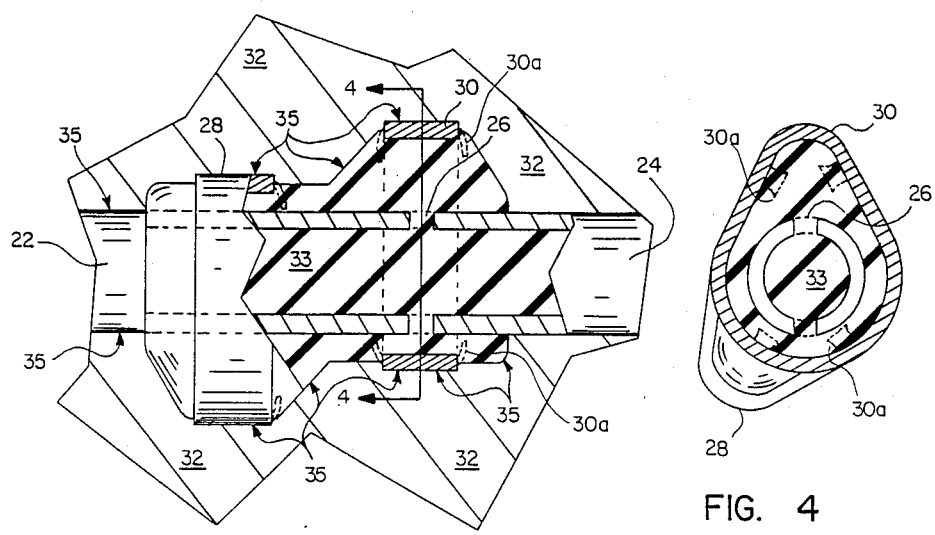
FIG. 3
FIG. 4
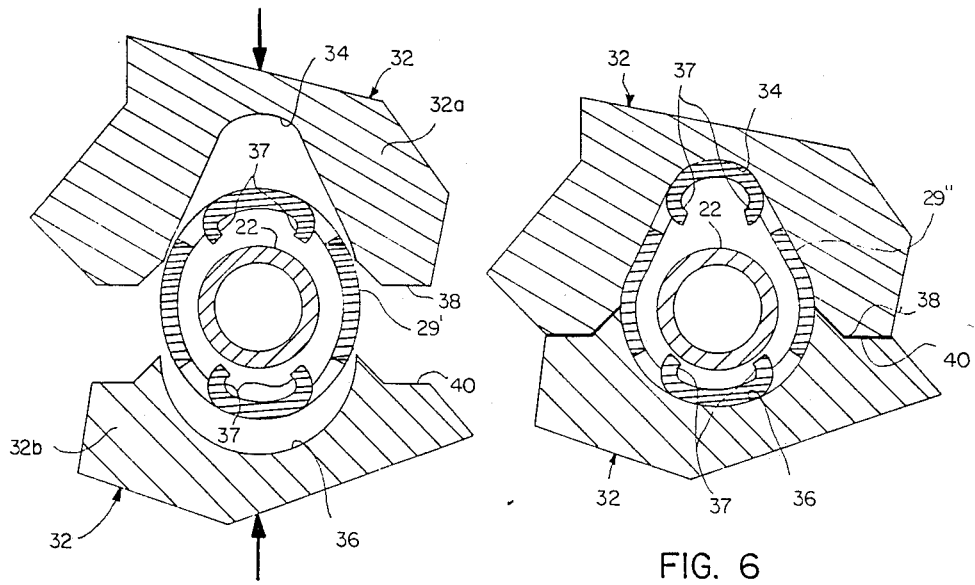
FIG. 5
FIG. 6

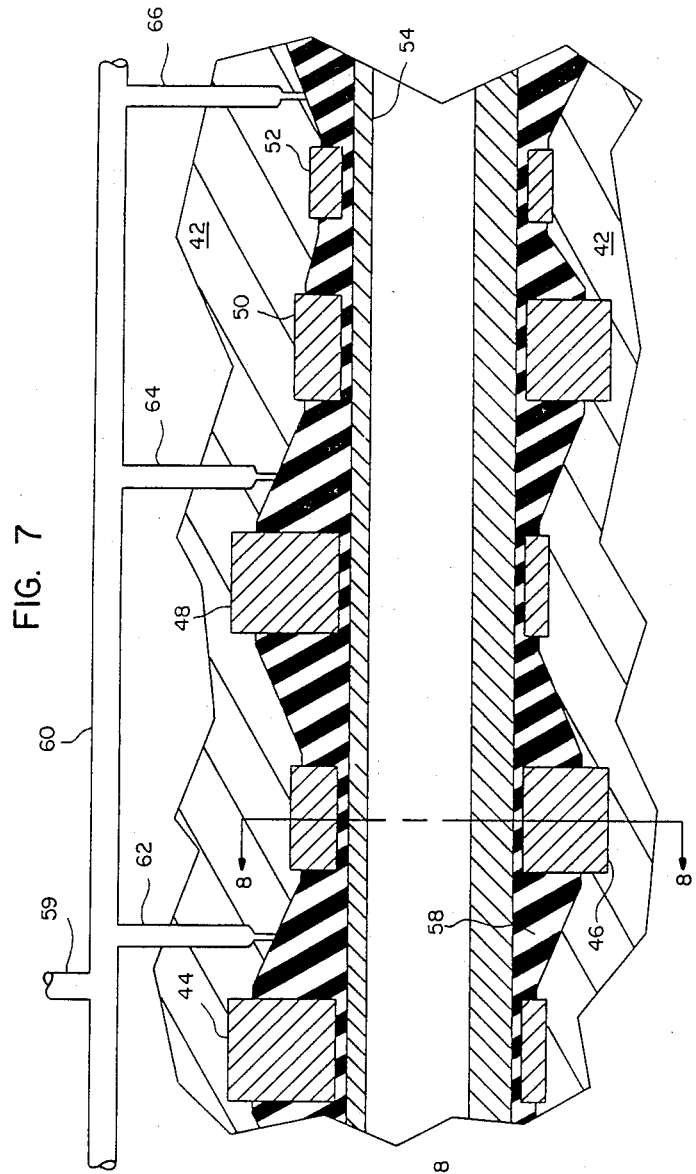
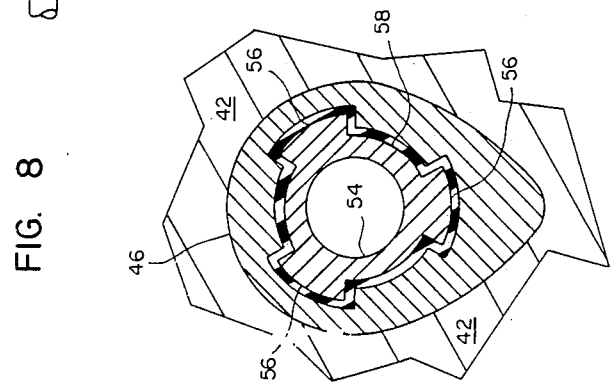

PLASTIC STABILIZED COMPOSITE CAMSHAFT

BACKGROUND OF THE INVENTION AND PRIOR ART

This application is a Continuation-In-Part of application Ser. No. 208,382, filed Jun. 17, 1988, which is a Continuation-In-Part of application Ser. No. 103,843, filed Oct. 1, 1987, now both abandoned.

This invention relates generally to shaft mounted cam elements and particularly to camshafts that are used in internal combustion engines.

Camshafts for internal combustion engines are well-known. A camshaft comprises an elongate cylindrical shaft having one or more bearing surfaces and one or more angularly positioned cam elements precisely located along the length thereof. The angular positioning is with respect to the centerline of the bearing surfaces of the cylindrical shaft. The cam elements control the opening and closing of the intake and exhaust valves of the internal combustion engine in the appropriate sequence as the camshaft rotates. Camshafts are manufactured by forging or casting. They are then subjected to a number of very exacting and expensive machining operations to grind and polish the circular bearing surfaces and the oval-shaped cam element surfaces. Conventional camshafts are quite massive and contribute significantly to the weight of an automobile engine.

Recently, the automotive industry has devoted a great deal of effort to improve vehicle gasoline mileage, that is the number of miles a vehicle can travel for each gallon of fuel consumed. In an effort to reduce weight, engines have been downsized and redesigned to use a lesser amount of material as well as to incorporate lighter weight materials. A feature that is growing in popularity, because of its reduced weight and higher efficiency, is the overhead camshaft. An overhead camshaft is supported above the cylinder head (outside of the engine block) and is driven in timed relationship with the engine crankshaft by means of gears and a timing belt. Its use obviates the need for push rods and rocker arms. One drawback is that an overhead camshaft generally makes a lot more noise than a conventional in-the-block camshaft.

There is also great impetus to achieve more power and efficiency from an engine. Newer designs often incorporate two intake valves per cylinder to assist in getting sufficient air/fuel mixture into the cylinder. Such engines require two camshafts and emphasize the desirability for lighter and more economical camshafts. The prior art has addressed this problem in a couple of ways.

Camshafts have been proposed that use a hollow cylindrical tube as a shaft member with the individual cam elements being separately fabricated and either brazed or welded in position along the hollow tube. Because of the thermal expansions experienced by the separate elements, camshafts made in this manner still require expensive grinding operations. Therefore, while the weight of the finished camshaft is reduced, its cost is not significantly impacted. Another technique involves positioning preformed cam elements, with apertures therein for reception of a shaft, in a support fixture. The fixture holds the preformed metal cam elements in appropriate positions and a hollow camshaft is inserted through the apertures. High pressure is applied to the inside of the hollow camshaft to bulge it out where permitted, i.e., where it passes through the cam elements. This action locks the cam elements to the shaft in a press fit. Here again, the resulting camshaft is lighter in weight, but the forces involved still necessitate expensive grinding of the camshaft before it can be used.

Other suggested approaches to camshaft manufacturing involve various techniques such as mechanically securing preformed cam lobes or cam elements to a shaft, injecting plastic material between the cam lobes and shaft for securing the elements and a combination of mechanical attachment and plastic injection. Such techniques have apparently not been commercialized. Thus there still exists a need in the art for a lightweight, low cost, readily manufacturable camshaft.

OBJECTS OF THE INVENTION

A principal object of the invention is to provide a novel camshaft.

Another object of the invention is to provide a camshaft that is lightweight, strong and economical to manufacture.

A further object of the invention is to provide a novel method for manufacturing a camshaft.

BRIEF DESCRIPTION OF THE DRAWINGS

These and other objects and advantages of the invention will be apparent upon reading the following description in conjunction with the drawings, in which:

FIG. 3 is a partial section through a portion of a camshaft constructed in accordance with the invention;

FIG. 4 is a cross section of FIG. 3 taken along the line 4—4;

FIGS. 5 and 6 are representations depicting a form of the invention in which the cam elements are formed in place;

FIG. 7 is a partial cross section of a camshaft being manufactured in accordance with a different version of the invention;

FIG. 8 is a sectional view taken along line 8—8 of FIG. 7;

DESCRIPTION OF THE PREFERRED EMBODIMENTS

Figure 1:
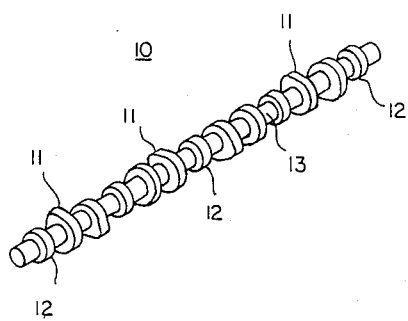
FIG. 1 is a perspective view of a prior art camshaft.

Referring to FIG. 1, a prior art camshaft 10 includes a plurality of eccentric or oval-shaped cam elements 11 interspersed with cylindrical bearing surfaces 12 on an elongated, solid cylindrical shaft 13. Such a camshaft, when constructed in accordance with prior art techniques, is either forged or cast and thereafter subjected to a plurality of expensive grinding operations for polishing and finishing the surfaces 11 and 12 to the required degree of precision. Such camshafts have been manufactured for many years and details of their construction are well-known.

Figure 2:
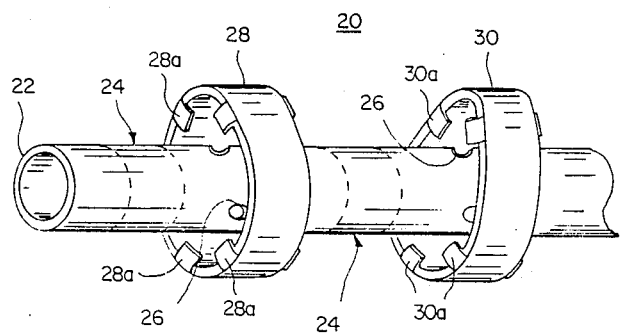
FIG. 2 is a representation of a portion of a camshaft constructed in accordance with one version of the invention.

In FIG. 2, a portion of a composite camshaft 20, constructed in accordance with one form of the invention, is shown. For purposes of clarity, the plastic fill material, e.g., the flowable, hardenable material that, in accordance with the invention, binds the cam elements to the shaft proper, is omitted. In this connection, the term plastic is used to denote a characteristic of a material and not as the name of any particular material. Thus metals are plastic when molten so as to be flowable. An elongated, hollow, cylindrical tube 22 is shown positioned within a pair of annular cam elements 28 and 30. Hollow tube or shaft 22 has a plurality of holes 26 formed therein, juxtaposed to respective ones of cam elements 28 and 30. As will be discussed, in accordance with another form of the invention, the outer surface of hollow tube 22 is polished to finished dimensions of the camshaft, at least at the bearing surfaces of the camshaft. Two such bearing surfaces 24, indicated in dashed lines, are shown and are comparable to the surfaces 12 in the prior art camshaft of FIG. 1. Also, as will be explained, the outer surfaces of cam elements 28 and 30 are polished to their finished condition prior to being "installed" in proper position with respect to hollow tube 22. The cam elements 28 and 30 are formed with inward protrusions 28a and 30a, respectively, that are larger toward the center of the cam lobes or elements 28 and 30. The shape of the protrusions is such that the plastic fill material will grip them more securely as the fill material shrinks slightly during hardening. The protrusions are therefore grip enhancing means. As shown, four such protrusions are used on each side of the cam element.

Figure 2A:
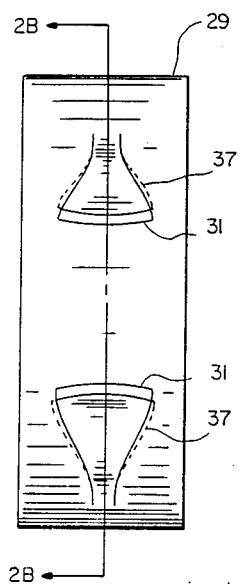
FIG. 2A is a side elevation of a cam element constructed in accordance with a different form of the invention.
Figure 2B:
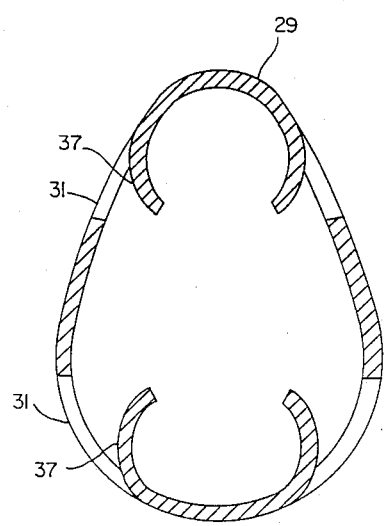
FIG. 2B is a cross section taken along the line 2B of FIG. 2A.

FIGS. 2A and 2B illustrate a preferred form of cam element construction which is easier to fabricate than that illustrated in FIG. 2. A plurality of generally "bell-shaped" tabs 37 are die cut and bent inwardly from the cam element 29, leaving apertures 31. It will be appreciated that other shapes and forms of such protrusions may be used with equal effect, the prime considerations being preservation of the grip enhancing characteristic and ease of manufacture.

In FIGS. 3 and 4, tube 22 is shown positioned in a mold cavity, generally indicated by reference numeral 32, that precisely holds or "fixtures" cam elements 28 and 30 in their respective correct positions. The cam elements occupy different positions along hollow tube 12 and have precise, but different, angular orientations with respect to the centerline of hollow tube 22. As is well-known, the parting line for the two halves of the mold are offset for each cam element to enable opening and closing of the mold without interference with the finished camshaft. The mold will also include appropriately located injection holes and vent holes for enabling the injection of plastic, i.e., flowable, hardenable mate-rial, generally indicated by reference numeral 33, to fill the voids between tube 22 and cam elements 28 and 30. Material 33 may comprise a glass filled polyester, although other types of plastic, hardenable materials may be used, including metals such as aluminum. The mold configuration or contour, illustrated by reference numeral 35, defines the precise final configuration of the finished camshaft. Thus the exterior surface of tube 22 precisely matches the interior configuration of the mold where external bearing surfaces, such as surface 24, are desired. Consequently, no plastic material contacts bearing surface 24. The mold interior configuration also precisely matches the outer surfaces of cam elements 28 and 30, thus preventing plastic material from contacting these surfaces. Similarly, the contour of the mold defines the outer configuration of the plastic, hardenable stabilizing material 33. As seen, the provision of holes 26 in tube 22 enables the flowable, hardenable material 33 to form interlocking elements between the tube and cam elements which provide excellent torsional resistance to preclude movement of cam elements 28 and 30 with respect to tube 22. While only a limited number of holes 26 are illustrated, more may be introduced if required for increased torsional resistance. As mentioned, the grip enhancing protrusions 30a cause the hardenable material to exert more force therein as the material shrinks upon cooling and hardening. While not specifically illustrated, grip enhancing tabs 37 on cam elements 29 are presently preferred in this form of the invention. When used the apertures 31 are filled with hardenable material.

The technique of molding on a mass production basis, utilizing side acting shuttles for positioning parts, is also well-known. The preferred technique for constructing a plastic, stabilized composite camshaft in accordance with the invention is to provide a mold having an offset parting line for accommodating the various cam elements in their precise angular displacements with respect to the tube and to include individual side acting shuttles for automatically feeding prefinished cam elements into their respective positions. Similarly, the tubular shaft is inserted in the mold and through the fixtured cam elements when the shuttles have completed their operations and the mold is closed. After closure of the mold, the hardenable, plastic material is injected into suitable entry ports to fill all cavities for rigidly affixing the individual cam elements in their precise positions, and with proper angular orientations with respect to the tube, upon hardening of the material. When that occurs, the mold is opened and the finished camshaft is removed.

Two methods of forming the cam elements are contemplated by the invention. In one method, the cam elements are preformed to their eccentric shapes and finish ground to precise tolerances. Side acting shuttle mechanisms automatically feed and locate the finished cam elements in their appropriate respective positions in the mold cavity. In another, and presently preferred approach for small engine applications, the cam elements are initially circular and formed into their final shape upon closure of the mold. The cam elements are preferably "sliced" from prefinished malleable tubing of appropriate diameter. They are formed into their eccentric final configurations in the process of being loaded into the mold by the shuttles and the final closure of the mold. (It will be appreciated that the grip enhancing protrusions or tabs may be die cut and bent from the cam element stock, or may be resistance welded to the interior of the cam element tubing prior to slicing the cam elements.)

The formed in the mold approach is illustrated in FIGS. 5 and 6 where the mold 32 is split into two portions 32a and 32b with matching parting lines 38 and 40. The interior surfaces 34 and 36 are precisely machined to the exterior dimensions of the finished cam element 29". Cam ring 29', having originally been circular, is shown in the finished eccentric (oval) cross section form of cam element 29". As indicated by the heavy arrows, during final closure of the mold 32, its two portions 32a and 32b are forced together at parting lines 38 and 40 as illustrated in FIG. 6. In so doing, cam ring 29' is forced into the appropriate configuration defined by the highly finished interior surfaces 34 and 36 of the mold portions 32a and 32b to form the cam element 29". The spaces between tube 22 and cam element 29" will of course be filled with the flowable, hardenable stabilizing material 33 which will grip tabs 37 securely to maintain cam element 29" in a fixed position relative to tube 22.

In practice, while hollow tube 22 has obvious advantages from a weight standpoint, the invention contemplates the use of solid axles or shaft members as well. In such case, the mold will be gated to inject the plastic, hardenable material adjacent the cam elements for fabricating a plastic stabilized composite camshaft. The cam elements and axle may be fabricated of heat treated steel. The cam elements may also be made of cast or powdered metal that is appropriately treated and finished. While the exact dimensions of the cam elements and hollow tube will depend upon the intended use of the camshaft, it is presently contemplated to use tubing having a wall thickness of 0.090" (0.228 cm).

The presently preferred embodiments of the invention for large engine applications, are illustrated in FIGS. 7-14. In these embodiments, cam elements are precast of powdered metal and the shaft or tube is drawn and has a fluted or ribbed exterior. The cam elements are cast with oversized interior openings that correspond generally to the cross sectional configuration of the shaft to permit a relatively small space therebetween for the flowable hardenable plastic stabilizing material.

With reference to FIGS. 7 and 8, the cross section along the length of tube or shaft 54 is seen to be nonsymmetrical because of the ribbed configuration of shaft 54. Camshaft 40 includes oval-shaped cam elements 44, 46, 48 and 50 that are each precisely positioned in a mold 42 with respect to shaft 54. Flowable, hardenable plastic stabilizing material 58 fills the spaces between shaft 54, the cam elements and mold 42. A cylindrical bearing element 52 is also shown and is affixed to shaft 54 in the same manner. In these embodiments, the plastic material is conventionally injected or gated to the mold via a sprue 59, that feeds a header 60 that, in turn, supplies a plurality of runners 62, 64 and 66. As best seen in FIG. 8, shaft 54 has a plurality of protrusions, in the form of ribs or flutes 56, and the interiors of the cam elements (cam element 46 is shown) are configured to match the contour of the shaft cross section, but are oversized to allow space for the plastic material 58.

It will be readily seen by those skilled in the art that it is desirable to arrange the flutes or ribs to place the interface of plastic, hardenable material 58 in compression rather than in shear when the camshaft is in operation. It will also be appreciated that the plastic material is hot when injected and experiences shrinkage as it cools and hardens. As will be seen more clearly in FIG. 10, the interior of the cam elements is configured to cause the plastic to increase the grip on the cam element as the material shrinks. As mentioned in connection with FIGS. 2-6, the precise configuration to be used is a matter of design choice and the invention is not to be limited to the specific disclosed configuration.

Figure 9:
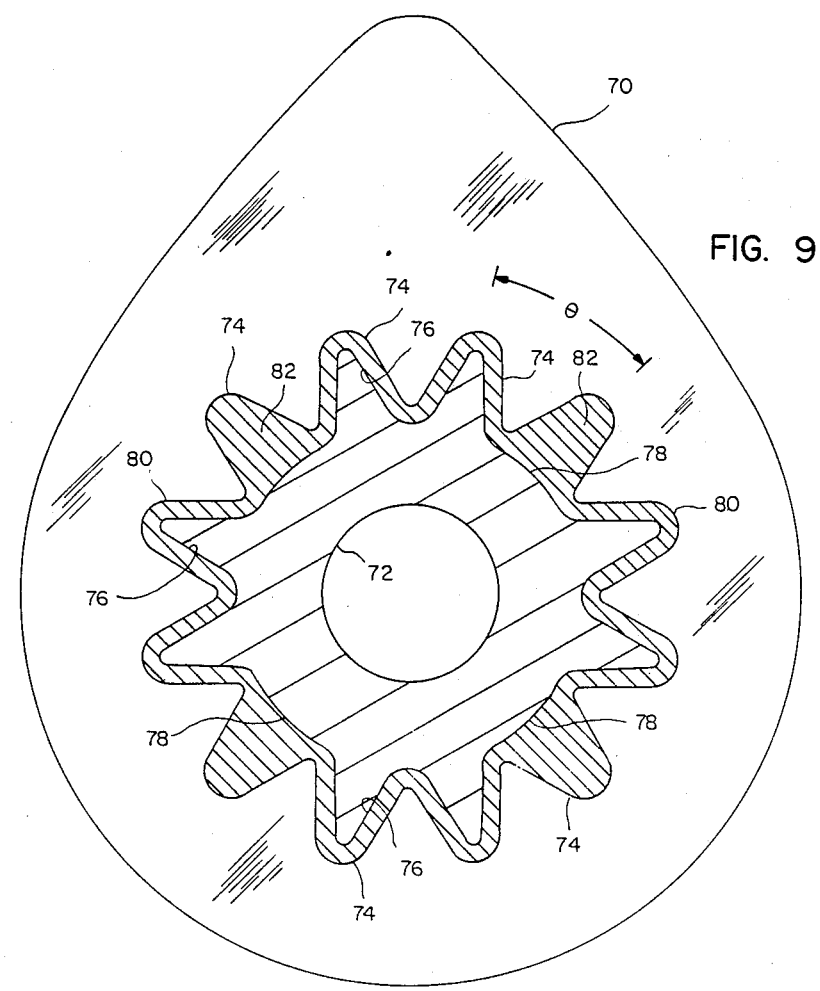
FIG. 9 is a cross section through a shaft and cam element constructed in accordance with another form of the invention.

FIG. 9 shows a special configuration suggested for use in an automotive engine application to resist the torque loading between the cam elements and shaft. Computer modelling of the loads, using a commercially available high temperature engineering resin, has indicated very adequate strength and stability for the design. As shown, a generally star-shaped interior cross section of the cam element 70 has "depressions" 74 matched with "protrusions or points" 76 on shaft 72, except for portions 78. An interface 80 of flowable plastic material separates the points and depressions with reservoir areas 82 being interspersed to help in the injection process.

The configuration also has symmetry that permits a single design of cam element 70 to be used in each position of the camshaft by simply changing its angle of orientation. Obviously the angle $\theta$ between the ribs or points must be selected with the engine cam angle in mind to permit this degree of interchangeability. It will also be noted that minor interior dimensional differences are compensated for in the assembly process wherein the mold interior precisely defines the alignment of the cam elements with the tube or shaft. The FIG. 9 configuration illustrated does not, however, enhance the grip of the plastic hardenable material on the cam element as the material shrinks during hardening.

Figure 10:
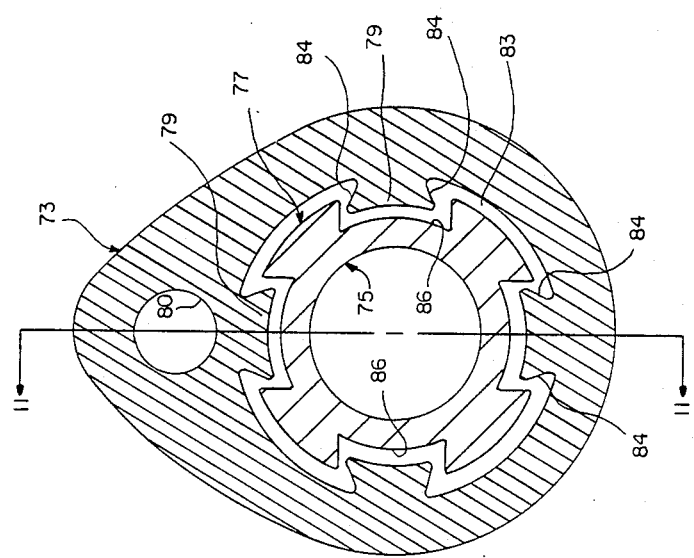
FIG. 10 is a cross section through a camshaft and cam lobe constructed in accordance with a preferred form of the invention for automotive use.

A recently prototyped design is illustrated in FIG. 10. Hollow shaft 75 has an external configuration of four symmetrically disposed flutes or ribs 77 separated by valleys 86. Cam element 73 has an interior configuration of spaced protrusions 79 that partially nest or interlock with flutes 77 and valleys 86. A hole 80 is included to lighten the cam element and to improve the flow of plastic material during injection. A small space 83 exists between the exterior configuration of shaft 75 and the interior configuration of cam element 73. The space 83 is continuous and ideally is kept small to reduce the amount and effect of shrinkage of the plastic material. As mentioned previously, the interlocking of the shaft and cam element results in the plastic material compressionally resisting torsional loading.

Figure 11:
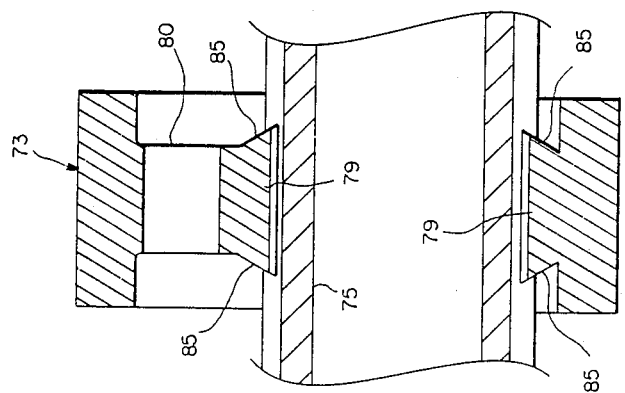
FIG. 11 is a sectional view taken along the line 11—11 of FIG. 10.

Protrusions 79 have a profile having outwardly tapered edge surfaces 84 (also 85 as seen in FIG. 11). The taper is such that plastic material shrinkage will increase the force exerted on the protrusion and thus tighten the grip on cam element 73. This is an important aspect of the invention since material shrinkage is always encountered, especially with the types of materials suitable for automotive engine applications.

Figure 12:
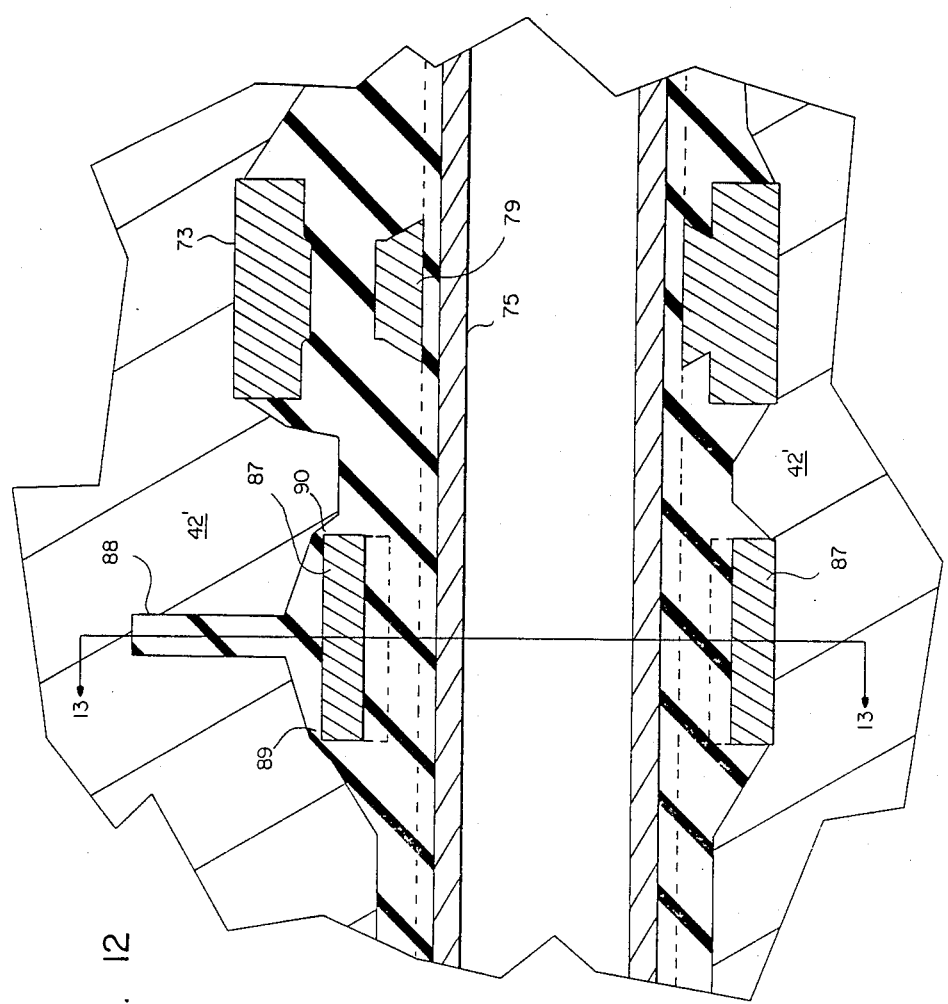
FIG. 12 is a partial sectional view of a camshaft constructed in accordance with another aspect of the preferred embodiment of the invention.
Figure 13:
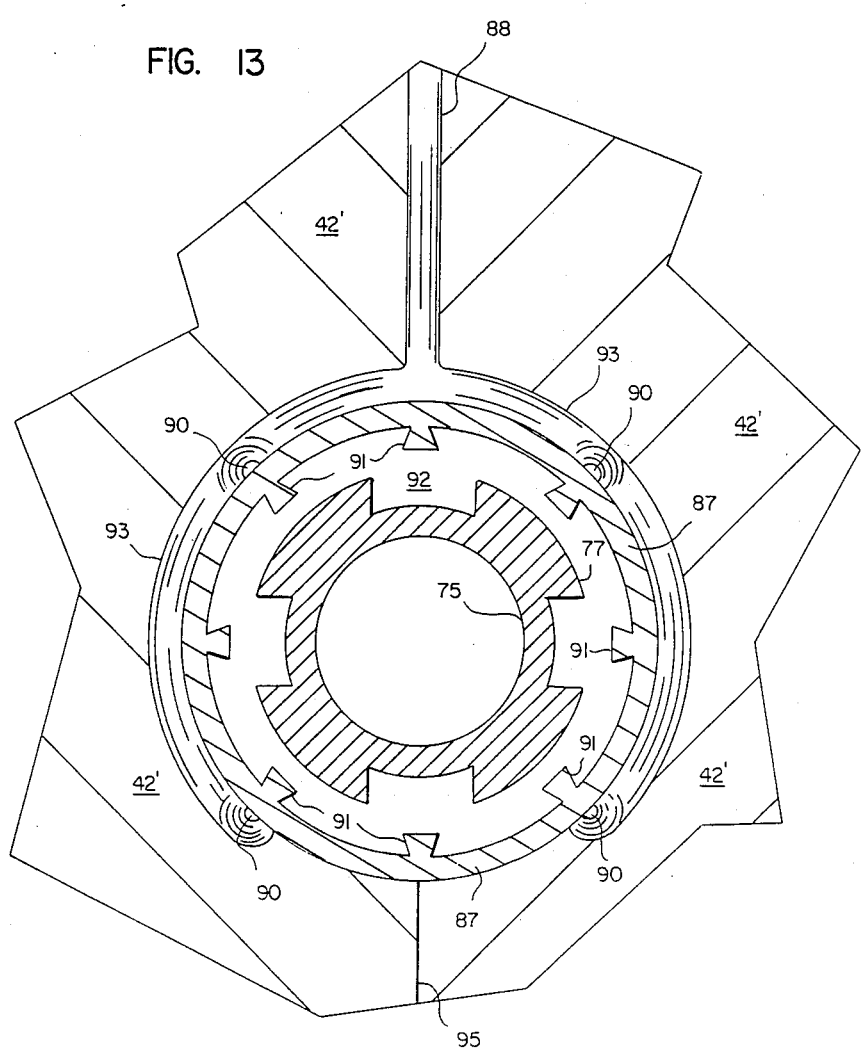
FIG. 13 is a view taken along line 13—13 of FIG. 12.

In FIGS. 12 and 13, another important aspect of the invention is shown. It has been found that the high pressure injection of plastic material into the mold that fixtures the cam elements, bearing elements and shaft has a tendency to stress the shaft, which is freely supported (at its ends) in the mold cavity. After hardening of the plastic material and removal of the finished camshaft from the mold, unacceptable runout of the bearing surfaces may occur as the stresses that may have been induced in the shaft during the injection process are relieved. In this aspect of the invention, the shaft is subjected to minimum forces that would upset its freely supported attitude by injecting the material against a solidly held surface, preferably a bearing surface, and forcing the material to simultaneously flow around the shaft to preclude any significant unbalance in forces applied to the shaft that would induce stresses therein. As illustrated in FIG. 12, a runner 88 that carries the plastic material under high pressure is formed by undercut portions of the mating sections of the mold 42'. Runner 88 opens to the surface of bearing elements 87 that are solidly supported by mold 42' about the majority of their surfaces. The only portions that are not supported are the undercut portions 93 (FIG. 13) and the gate areas 90 that permit the plastic material to flow into the spaces between the cam and bearing elements and mold surfaces and the shaft.

As best seen in FIG. 13, which is a cross sectional view of the shaft and mold taken through a bearing element 87, runner 88 divides into portions 93 that encircle bearing element 87 and inject plastic material at approximately equally spaced portions around the circumferences of bearing elements 87 through small gates 90. The result is that high pressure injection of plastic material into mold 42' may occur without subjecting shaft 75 to unbalanced lateral forces that might otherwise result in bending and stressing the shaft. Bearing element 87 also includes a number of inwardly directed protrusions 91 having profiles that are designed to cause the shrinking plastic material to increase the grip on the bearing element. The space 92 between the shaft exterior configuration and bearing interior configuration is desirably made larger to permit more rapid and unobstructed flow of the plastic material. No interlocking or nesting of the bearing element protrusions 91 and the shaft flutes 77 is shown since there are no torsional forces between the bearing element and shaft.

When the two halves of mold 42' are separated (along parting line 95) the hardened plastic in runner 88 and portions 93 may readily be broken away from the camshaft, since it does not adhere to the surfaces of bearing elements 87. As shown, the plastic is injected around bearing element 87 at four gate points 90 that are ninety degrees apart.

Figure 14:
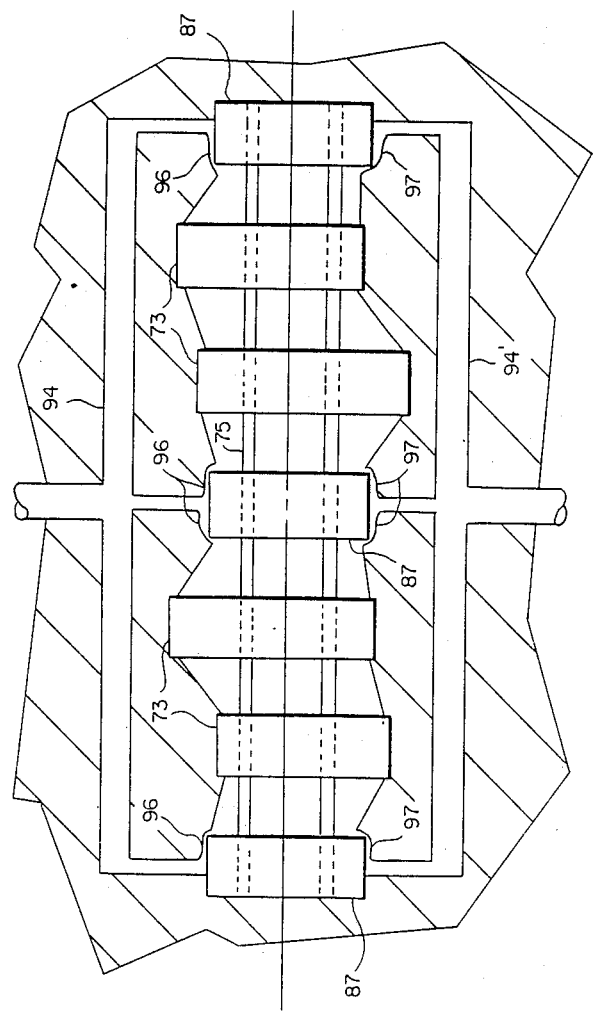
FIG. 14 is a view illustrating another technique for manufacturing the camshaft of the invention.

In FIG. 14, another technique for injecting the plastic material into the mold without disturbing the freely supported shaft is shown. Here multiple sprues 94 and 94' are supplied in parallel to inject the plastic about bearing elements 87 and into the interior of the mold via gates 96 and 97. Injection occurs at displaced points along the shaft 75 to assist in uniform and rapid filling of the mold cavity. Other techniques for rapidly and uniformly injecting without laterally stressing the freely supported shaft 75, will occur to those skilled in the art. It will also be appreciated that, depending upon environment, one or more of the various forms and aspects of the invention may be used with benefit.

It will be appreciated that numerous changes in the described embodiments of the invention will be apparent to those skilled in the art without departing from its true spirit and scope. The invention is to be limited only as defined in the claims.

What is claimed is:

1. A camshaft comprising:
   an elongated shaft member having a first cross sectional configuration;
   a plurality of cam elements positioned along the length of said shaft member in predetermined angular relationships thereto;
   the interior of each of said cam elements having a second cross sectional configuration for nesting with said first configuration and defining a continuous space therebetween;
   a flowable, hardenable material in said space for maintaining said cam element in said predetermined angular relationship on said shaft member;
   said first and second configurations interlocking such that sections of said hardenable material in said space compressionally resist torsional loading between said cam element and said shaft member and said second configuration being such that shrinkage of said flowable, hardenable material increases its grip on said cam element.

2. The camshaft of claim 1 wherein said second cross sectional configuration includes protrusions that are larger toward the axis of the shaft member.

3. The camshaft of claim 2 wherein said cam elements include an aperture for facilitating flow of said flowable, hardenable material.

4. A camshaft comprising:
   an elongate shaft member having an outer periphery;
   a cam element including an aperture having an inner periphery similar to said outer periphery and defining a continuous space therebetween;
   interlocking means comprising an interlocking section of said outer periphery and said inner periphery;
   a plastic hardenable material in said continuous space for rigidly affixing said cam element to said shaft member;
   at least some of said material between portions of said interlocking sections compressionally resisting torsional loading of said camshaft; and
   the shape of said interlocking section of said inner periphery increasing the grip of said material on said cam element upon shrinking of said material.

5. The camshaft of claim 4 wherein said interlocking sections and said material therebetween form a dovetail joint.

6. The camshaft of claim 4 wherein said interlocking section includes an outwardly tapered projection from one of said cam element and said shaft member and an inwardly tapered depression in the other of said cam element and said shaft member.

7. The camshaft of claim 6 wherein said outwardly tapered projection is on said cam element and is outwardly tapered in three dimensions for enhancing the grip of said material thereabout.

8. The camshaft of claim 7 wherein said outwardly tapered projection defines a truncated pyramid.

9. A composite camshaft comprising:
   an elongate shaft member having a cross section defining a plurality of first protrusions;
   a plurality of identical cam elements spaced along said shaft member and each having an opening defining a plurality of second protrusions, said first protrusions and said second protrusions dovetailing and forming a small continuous space therebetween;
   a hardened flowable material in said continuous space securing said cam elements in position along said shaft member; and
   said first and second protrusions being shaped such that portions of said material therebetween compressionally resist torsional loading of said camshaft and such that upon shrinkage of said material, said cam elements and said camshaft are more tightly secured together.

10. The camshaft of claim 9 wherein the number of cam elements is an integral multiple of the number of first and second protrusions.

11. The camshaft of claim 10 wherein said second protrusions are outwardly tapered in three dimensions.

* * * * *